(12) United States Patent
Makino

(10) Patent No.: US 7,309,046 B2
(45) Date of Patent: Dec. 18, 2007

(54) METHOD FOR DETERMINATION OF FUSELAGE SHAPE OF SUPERSONIC AIRCRAFT, AND FUSELAGE FRONT SECTION SHAPE

(75) Inventor: Yoshikazu Makino, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 408 days.

(21) Appl. No.: 11/011,068

(22) Filed: Dec. 15, 2004

(65) Prior Publication Data

US 2005/0218267 A1    Oct. 6, 2005

(30) Foreign Application Priority Data

Dec. 18, 2003  (JP) ............................ 2003-420316

(51) Int. Cl.
*B64C 1/38*    (2006.01)
(52) U.S. Cl. .................................. 244/130; 244/99.12
(58) Field of Classification Search ................ 244/130, 244/99.12, 45 R, 1 R, 119
See application file for complete search history.

(56) References Cited

U.S. PATENT DOCUMENTS 7,252,263 B1 *   8/2007 Hagemeister et al. ....... 244/1 R
2005/0121555 A1*  6/2005 Morgenstern et al. ...... 244/130

OTHER PUBLICATIONS

William R. Sears, "On Projectiles of Minimum Wave Drag", vol. IV, No. 4, pp. 361-366, Cornell University.

A.R. Seebass et al., "Design and Operation of Aircraft to Minimize Their Sonic Boom", vol. 11, No. 9, pp. 509-517, Sep. 1974, Cornell University, Ithaca, N.Y.
Christine M. Darden, NASA Technical Paper 1348, "Sonic Boom Minimization With Nose-Bluntness Relaxation", 1979 Langley Research Center, Hampton, Virginia.
Y. Makino et al., "Nonaxisymmetrical Fuselage Shape Modification for Drag Reduction of Low-Sonic-Boom Airplane", vol. 41, No. 8, pp. 1413-1420, Reprinted from AIAA Journal.

* cited by examiner

*Primary Examiner*—Timothy D. Collins
(74) *Attorney, Agent, or Firm*—Westerman, Hattori, Daniels & Adrian, LLP.

(57) ABSTRACT

Objectives to be achieved by this invention are the provision of a method for determining the ultimate fuselage shape of supersonic aircraft by integral modification of the upper and lower surface shapes of the fuselage, to reduce sonic boom without increasing wave drag, as well as the provision of such a fuselage front section shape. A method for determining the fuselage shape of an aircraft for supersonic flight of this invention employs different methods of determining the fuselage lower-surface shape and the fuselage upper-surface shape, whose upper and lower boundary is defined for each fuselage cross-section by the horizontal line including two points at which the fuselage width from the bilateral symmetry plane is maximum. The above fuselage lower-surface shape is determined by optimization of an objective function to minimize the pressure increase amount of the sonic boom pressure waveform on the ground, estimated using a panel method and waveform parameter method; the fuselage upper-surface shape is determined by optimization of an objective function so as to minimize drag, estimated using a panel method.

5 Claims, 9 Drawing Sheets

A perspective view of a low-drag/low-boom airframe this invention

A perspective view of a low-drag/low-boom airframe this invention front view plane view side view A low-drag/low-boom airframe of this invention A perspective view of
a conventional airframe
based on Area Rule design front view plane view side view A conventional airframe based on Area Rule design

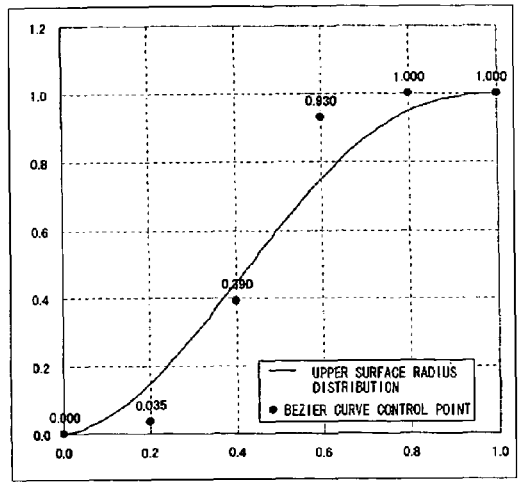
Fig. 8-A
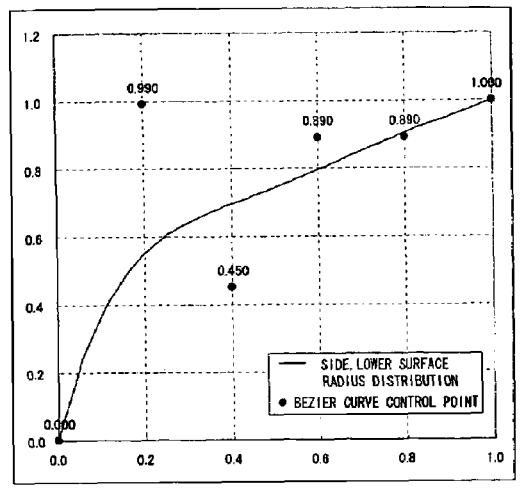
Fig. 8-B
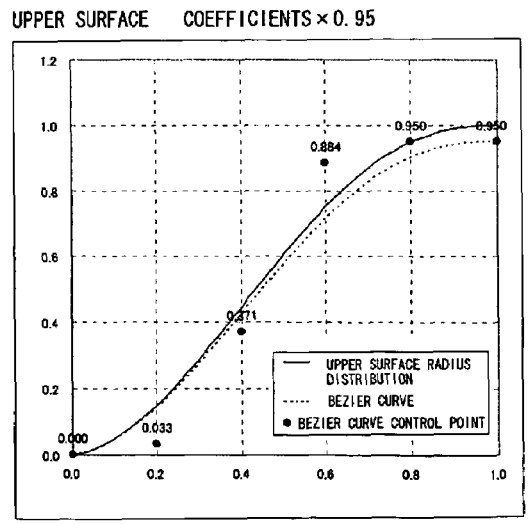
Fig. 9-A1
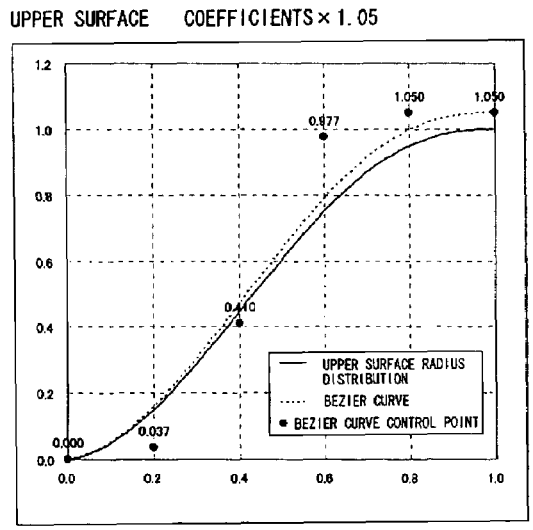
Fig. 9-A2

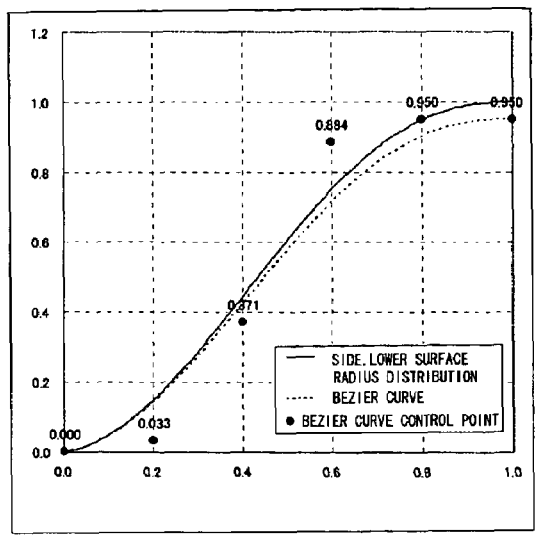
Fig.10-B1
SIDE, LOWER SURFACE SHARP    COEFFICIENTS × 0.95
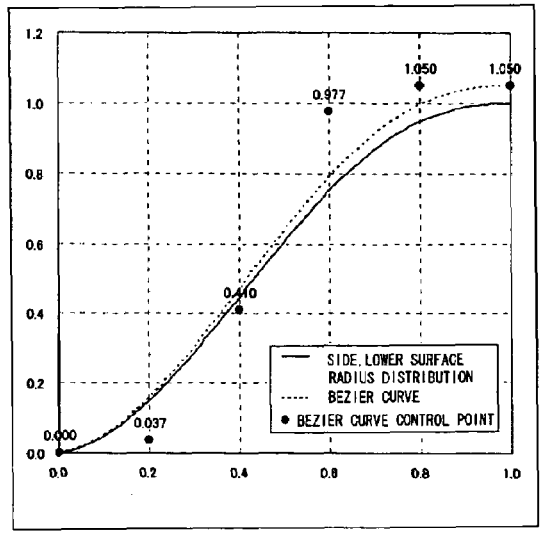
Fig.10-B2
SIDE, LOWER SURFACE SHARP    COEFFICIENTS × 1.05

Fig.11
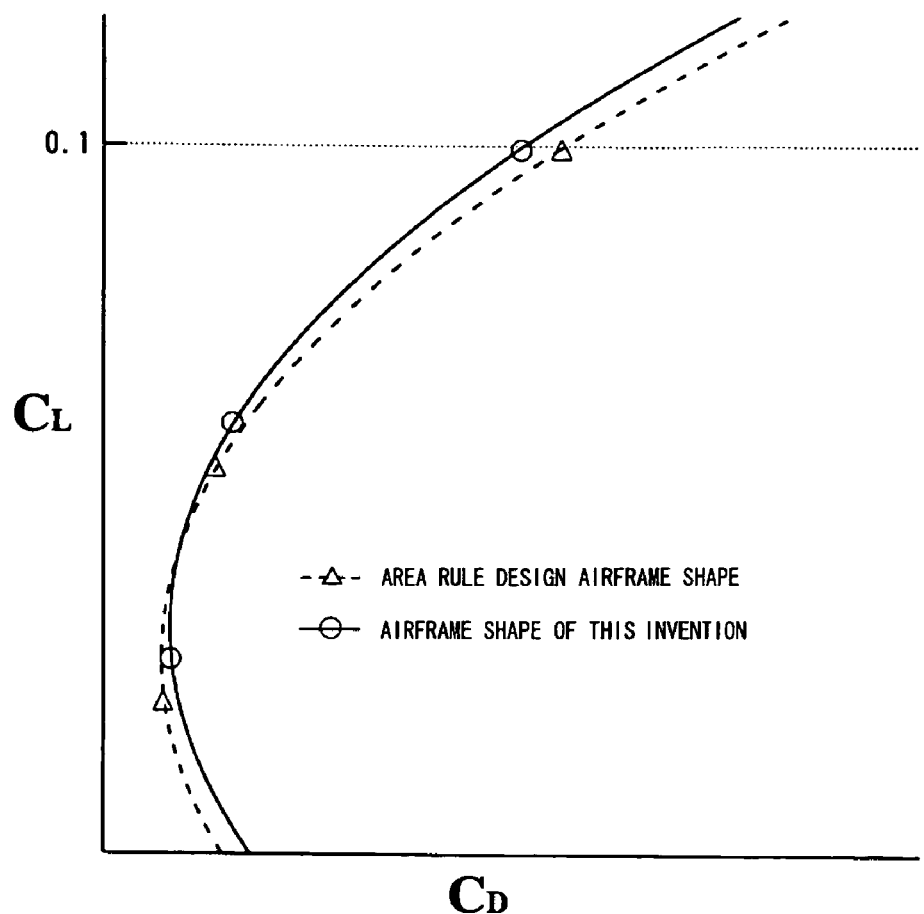
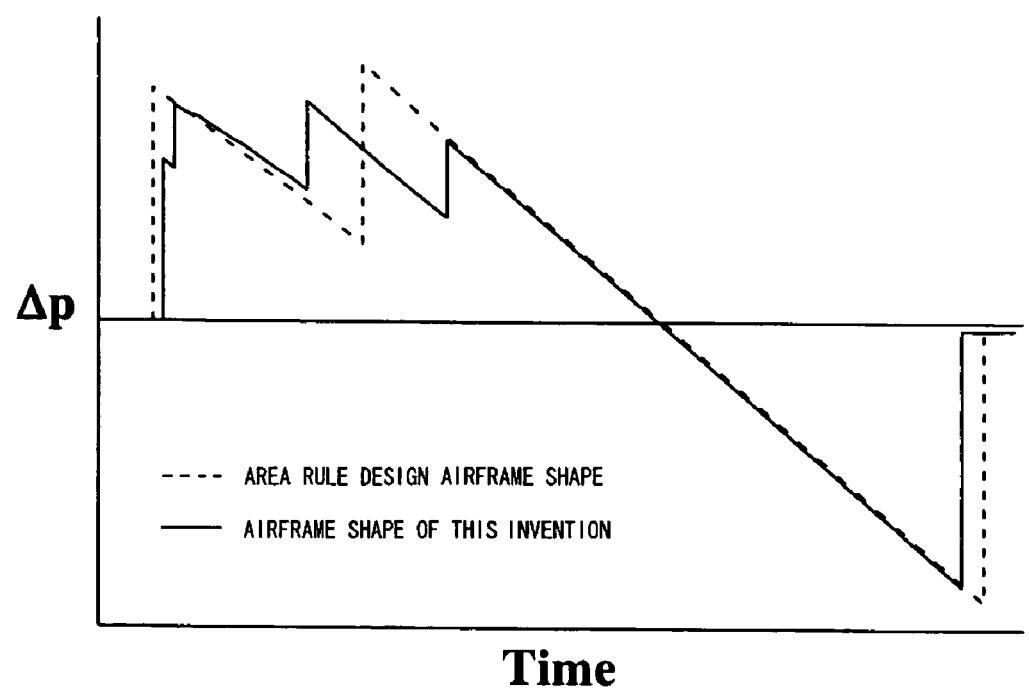

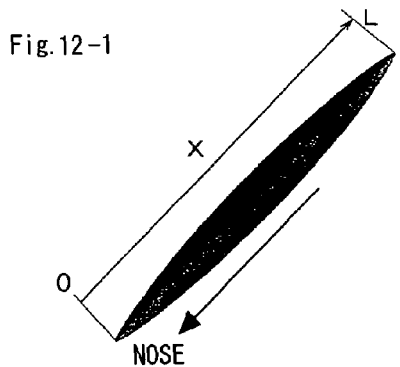
Fig. 12-1
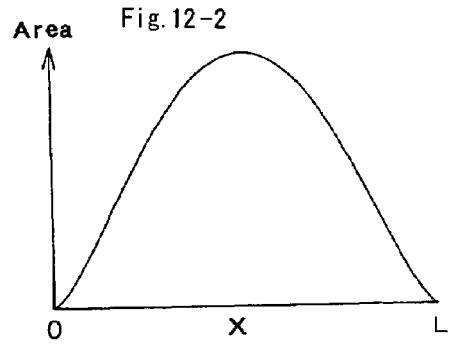
Fig. 12-2
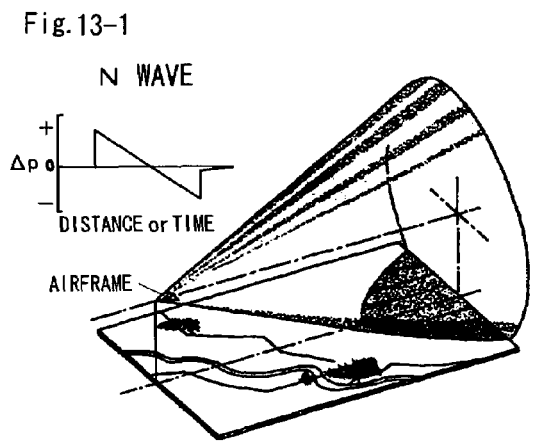
Fig. 13-1 N WAVE
Fig. 13-2 (NASA CP-3027)
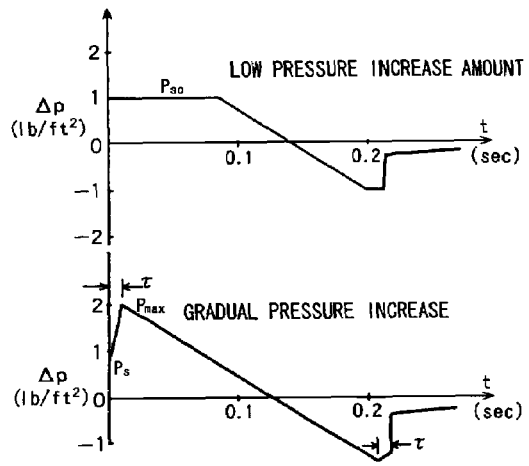
Fig. 13-3 LOW SONIC BOOM PRESSURE WAVEFORM
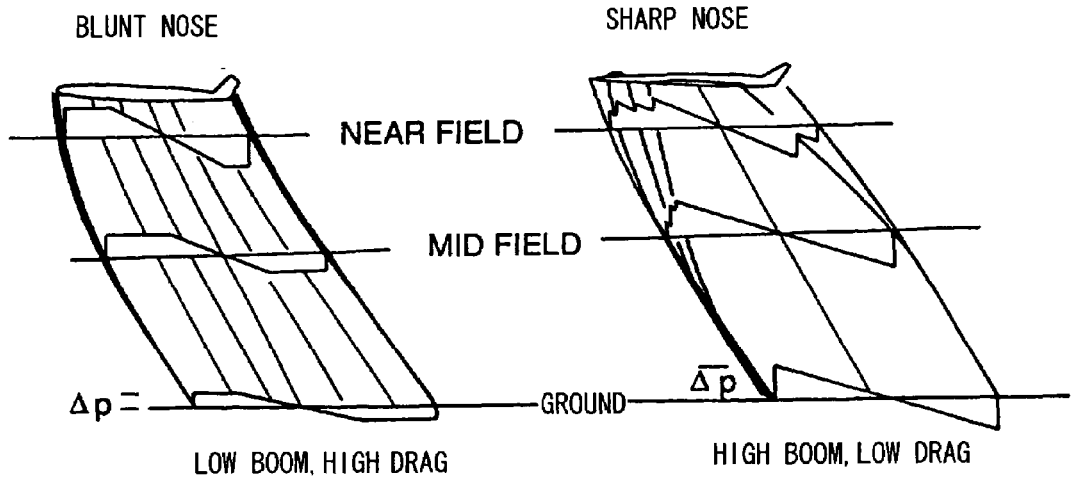
Fig. 14

US 7,309,046 B2

METHOD FOR DETERMINATION OF FUSELAGE SHAPE OF SUPERSONIC AIRCRAFT, AND FUSELAGE FRONT SECTION SHAPE

BACKGROUND OF THE INVENTION

1. Field of the Invention

This invention relates to a method of determination of fuselage shape, and a fuselage front section shape, to suppress sonic boom without increasing the wave drag of supersonic aircraft.

2. Description of the Related Art

In general, in order to satisfy conditions for economy and environmental compatibility, a supersonic aircraft must [be designed] so as to suppress wave drag caused by shock waves and sonic boom, which is an acoustic phenomenon affecting persons, animals, buildings and other structures on the ground.

The axisymmetric shape in which the area cross-sectional distribution with respect to the length position is longitudinally symmetric (a Sears-Haack body; see Sears, W. R., "On Projectiles of Minimum Wave Drag", Quart. Appl. Math., Vol. 14, 1947), shown in FIG. 12, is known as the shape of a body in supersonic flight with minimum wave drag. In order to reduce wave drag of an supersonic aircraft, the equivalent body of revolution of an airplane which has the area distribution of the circumferential average of the area, projected in the axial direction of the aircraft, of the cross-sectional area cut by the Mach plane (the plane whose normal vector is inclined by an angle $\mu=\sin^{-1}(1/M)$ with respect to the axial direction), determined by the Mach number at which the aircraft flies, deemed to be equivalent to this Sears-Haack body. The method used to design such aircraft is called the Area Rule design method.

Research has been conducted over many years on methods to reduce sonic boom; the most effective method involves changing the pattern of the shock wave generated through innovations in the aircraft body shape, in order to reduce the sonic boom intensity on the ground. Shock waves generated from the various components of an ordinary supersonic aircraft exhibit a phenomenon in which, in the process of propagation in air, waves entailing larger changes in pressure propagate more rapidly in air, and as a consequence the shock waves are units as two strong shock waves emanating from the nose and from the tail sections, and are observed on the ground as an N pressure wave accompanied by two large increases in pressure. The shock wave created and caused to propagate by the supersonic aircraft propagates in the form of a cone until reaching the ground, as shown in FIG. 13-2. At this time, the N pressure wave comprises a shock wave which changes suddenly from atmospheric pressure to high pressure, due to the nose portion, and a shock wave which, after declining somewhat is returned suddenly from low pressure to high pressure due to the tail portion, as shown in FIG. 13-1. The sonic boom of the Concorde, which is representative of supersonic aircraft, is from 2 to 3 psf, which is said to be equivalent to the sound of lightning striking close by.

Because supersonic flight is limited in airspace over terrain where noise due to sonic boom is a problem, commercialization of supersonic passenger aircraft has been difficult. The above-described method of reducing sonic boom involves forming a low-sonic-boom-pressure waveform, which is not an ordinary N wave, by modifying the aircraft shape and suppressing the unification of shock waves. George and Seebass have proposed boom minimization, including the trailing-edge wave, based on near-field theory, and studying two types of pressure waves, the "minimum over-pressure waveform" shown in the upper of FIG. 13-3, and the "minimum-shock waveform" shown in the lower of FIG. 13-3; and in Seebass, A. R. and George, A. R., "Design and Operation of Aircraft to Minimize Their Sonic Boom", Journal of Aircraft, Vol. 11 No. 9, pp. 509-517, 1974, they present a theoretical study which focuses on the sum of equivalent cross-sectional area distributions determined from the cross-sectional area distribution of an aircraft forming a low-sonic-boom-pressure waveform and the lift distribution. This focuses on the shape of the fuselage as one factor due to which the aircraft body causes pressure changes in the atmosphere, and on the second factor of the reaction to the lift received by the wings; a theoretical analysis is thus presented in which, while the reaction to the lift has a downward directionality, an equivalent cross-sectional area is posited which takes the [reaction to the lift] to be in all directions, similarly to the aircraft body, so that when the sum of the equivalent cross-sectional area distribution determined from the cross-sectional area of the aircraft and the lift distribution has a prescribed distribution, low sonic boom can be realized. However, if a shape having such an equivalent cross-sectional area distribution is computed, the nose shape is blunt, resulting in considerable airframe drag. Subsequently, in Darden, C. M., "Sonic-Boom Minimization with Nose-Bluntness Relaxation", NASA TP-1348, 1979, Darden proposed a method and program which use the cross-sectional area distribution of George and Seebass to reduce the airframe drag arising from this nose portion.

Because a shock wave has the property that waves with greater increases in pressure propagate through the air more rapidly, in order to suppress the unification of shock waves, it is effective to make the nose shape blunt to cause an intense shock wave, and to weaken the rearward shock wave. However, such a blunt nose shape cannot satisfy the [conditions of the] above-described Area Rule design to minimize wave drag, and an increase in wave drag is unavoidable. The equivalent cross-sectional area distribution of an aircraft forming a low-sonic-boom pressure waveform, described in the above work by George and Seebass, also indicates that the nose shape will be blunt; and the design method of Darden to relax the degree of bluntness of the nose shape can reduce the wave drag with only a small increase in the sonic boom intensity, but as indicated in FIG. 14 there is a trade-off between sonic boom and wave drag, and modifying the airframe shape has the effect of worsening one or the other, or possibly both. Thus there has not yet been found an ideal aircraft shape which achieves [the aims of] both the Area Rule design, and low sonic boom design.

In light of such circumstances, the inventors' research group has conducted research with the aim of developing a method of determining the fuselage shape of a supersonic aircraft which reduces sonic boom without increasing wave drag. Because sonic boom is a shock wave which propagates downward from the airframe, the upper-surface shape of the airframe is assumed not to affect the sonic boom intensity, and so an attempt was made to suppress the increase in wave drag by replacing the fuselage upper-surface shape of a low-sonic-boom airframe with a low-wave-drag shape. An airframe model of a low-wave-drag fuselage of the prior art is shown on the right in FIG. 15, an airframe model of a conventional low-sonic-boom fuselage is shown on the upper left, and an airframe model of a low-wave-drag/low-boom fuselage proposed by the research group of the inventors is shown on the lower-left. That is, as is clear from the drawings seen from the forward direction of the airframe, the fuselage of a conventional low-wave-drag airframe model is narrow, the fuselage of a conventional low-sonic-boom airframe model is wide, and the fuselage of the low-wave-drag/low-boom airframe model proposed by the inventors' research group combines completely different shapes as the upper and lower surface shapes of the fuselage. In other words, as the upper half the airframe model of a conventional low-wave-drag fuselage is adopted, and as the lower half of the fuselage the airframe model of a conventional low-sonic-boom fuselage is adopted, in an airframe shape which combines the two.

The inventors' research group has fabricated mock-ups of a conventional low-drag fuselage airframe model, a conventional low-sonic-boom fuselage airframe model, and of the low-drag/low-sonic-boom fuselage airframe model proposed by the inventors' research group. [These were] used in wind tunnel experiments to obtain various design data, results of which were reported in Makino, Y. et al, "Non-axisymmetrical Fuselage Shape Modification for Drag Reduction of Low-Sonic-Boom Airplane", AIAA Journal, Vol. 41 No. 8, pp. 1413-1420, 2003. The graphs shown in FIG. 16 compare the cross-sectional area distributions of the three airframes; circles (○) denote airframe cross-sectional area, squares (□) denote the equivalent cross-sectional area of lift, and triangles (Δ) are the sum of the former two; broken lines indicate the theoretical optimum distribution. As is clear from these drawings, because the upper-surface shape is replaced with a low-drag shape in the airframe model having a low-drag/low-boom fuselage, the cross-sectional area distribution deviates considerably from the conventional theoretical target value for low sonic boom.

However, upon viewing the results of pressure waveform measurements obtained from wind tunnel experiments using mock-ups of these airframe models, the waveforms shown in FIG. 17 were obtained. Because these are values measured in wind tunnel experiments, they are not far-field pressure measurements, but are equivalent to pressure measurements in the near field. On comparing the three airframes, the conventional low-drag fuselage is the graph plotted with circles (○); the pressure change due to the airframe tip portion is comparatively small, but there is a large pressure fluctuation in the center portion of the airframe. There is no great difference in the results for the airframe model with the conventional low-sonic-boom fuselage, denoted by triangles (Δ), and the airframe model with the low-drag/low-boom fuselage proposed by the inventors' research group, denoted by diamond shapes (◇); although the pressure change due to the airframe tip portion is comparatively large, and there is a large pressure change in the center portion of the airframe as well, the magnitude is much smaller than for the conventional low-drag fuselage. The large pressure change due to the airframe center portion of the conventional low-drag fuselage becomes a wave and, in the course of propagating through the atmosphere, is unified with the wave of comparatively small pressure fluctuation of the front, to impart a substantial pressure fluctuation on the ground. On the other hand, in the pressure waveforms resulting from the airframe model of the conventional low-sonic-boom fuselage and the airframe model of the low-drag/low-boom fuselage proposed by the inventors' research group, the comparatively large pressure change due to the airframe tip portion propagates fairly rapidly through the atmosphere, and the subsequent large pressure fluctuation due to the airframe center portion does not overlap with the former, so that the sonic boom intensity does not become large. Thus the airframe model with low-drag/low-boom fuselage proposed by the inventors' research group achieves low sonic boom. Also, upon measuring the force on the airframe in the axial direction, the resulting data in the graph shown in FIG. 18 were obtained. The vertical axis plots the drag $C_D$, and the horizontal axis is the dimensionless coefficient of lift $C_L$. Filled circles (●) denote data for the conventional low-boom airframe model; empty circles (○) are data for the conventional low-drag airframe model; and diamond shapes (◇) denote data for the airframe model with low-drag/low-boom fuselage proposed by the inventors' research group. As is clear from this graph, substantially the same reduced drag as in the conventional low-drag airframe model is attained.

Based on the above experimental results, and given the supposition that the upper surface shape of the airframe does not affect the sonic boom intensity below the airframe, it was verified that an airframe model in which the upper surface shape of an airframe designed to reduce wave drag is replaced with an Area Rule fuselage, will exhibit substantially low drag, and moreover can achieve low sonic boom.

SUMMARY OF THE INVENTION

Based on the assumption that the upper-surface shape of the airframe does not have an effect on the sonic boom intensity downward from the airframe, and based on the consequent judgment that it is appropriate for wave drag reduction to modify the upper-surface shape of an airframe so as to resemble an Area-Rule fuselage, an objective to be attained by this invention is to present a method of determination of the fuselage shape of an advanced supersonic aircraft in which the upper-surface portion of a conventional low-boom fuselage is not simply replaced with a conventional low-drag fuselage, but the upper and lower surface shapes of the fuselage are integrally modified so as to reduce sonic boom without increasing wave drag. [A further objective] is to provide such a fuselage front section shape.

The method of determination of fuselage shape of an aircraft flying at supersonic speeds of this invention employs different methods of determining the fuselage lower-surface shape and the fuselage upper-surface shape, whose upper and lower boundary is defined for each fuselage cross-section by the horizontal line including two points at which the fuselage width from the bilateral symmetry plane is maximum. The above-described fuselage lower-surface shape is determined through optimization of an objective function to minimize the amount of pressure increase of the sonic boom pressure waveform on the ground, estimated using the panel method and waveform parameter method. The fuselage upper-surface shape is determined by optimization of an objective function to minimize the drag, estimated using the panel method.

Further, in the fuselage front section shape of an aircraft of this invention, the fuselage lower-surface shape, whose upper and lower boundary is defined for each fuselage cross-section by the horizontal line including two points at which the fuselage width from the bilateral symmetry plane is maximum, is determined by optimization of an objective function to minimize the amount of pressure increase in the estimated sonic boom pressure waveform on the ground; the fuselage upper-surface shape is [the shape of] the fuselage of an aircraft designed to fly at supersonic speeds, determined so as to minimize wave drag, and having a concave radius of curvature in the upper-surface shape of the nose which is the front half of the front section of the fuselage, formed from a front section, middle section, and rear section, and with the front section to the rear of the nose being convex, with the fuselage front section side and bottom surface shapes having a sharp convex portion at the nose, and a gradual convex shape in the front section to the rear of the nose.

According to this invention, by means of a method of design which uses different methods to determine the upper surface shape and the lower surface shape of the fuselage, the fuselage shape of a supersonic aircraft can be determined having a fuselage lower surface shape which suppresses sonic boom by forming a strong pressure peak in the nose lower surface, and a fuselage upper surface shape which suppresses the shock wave from the nose and reduces the wave drag of the overall airframe, such that a gradual pressure increase occurs at the upper surface of the front section to the rear of the nose.

Also according to this invention, efficient Area Rule design is made possible by a design method which employs different methods to determine the fuselage upper surface shape and lower surface shape, so that wave drag can be reduced even more than for an Area Rule fuselage based on a conventional axisymmetric fuselage.

According to this invention, in a fuselage front section of a supersonic aircraft designed using different methods to determine the upper surface shape and the lower surface shape, sonic boom can be suppressed by forming a strong pressure peak at the nose on the fuselage lower surface, and an increase in wave drag can be suppressed by suppressing the shock wave at the fuselage upper surface nose, causing a gradual pressure increase in the front section to the rear of the nose.

BRIEF DESCRIPTION OF THE DRAWINGS

FIG. 8 shows graphs of Bezier curves and of Bezier curve control points determining the distributions of the upper-surface radius and lower-surface radius of a first embodiment of an airframe of this invention;

FIG. 9 shows graphs of Bezier curves and Bezier curve control points indicating appropriate widths of the distribution of the upper-surface radius;

FIG. 10 shows graphs of Bezier curves and Bezier curve control points indicating appropriate widths of the distribution of the side surface and lower surface radii;

FIG. 11 shows graphs comparing the first embodiment of an airframe of this invention and a conventional low-drag airframe, with respect to the dimensionless coefficient of drag $C_D$/dimensionless coefficient of lift $C_L$ characteristic and pressure waveform;

FIG. 12 shows a Sears-Haack body for which wave drag is minimum and the cross-sectional area distribution thereof;

FIG. 13 explains the sonic boom phenomenon and reduction of boom;

FIG. 14 illustrates the paradox of low sonic boom and Area Rule design;

DESCRIPTION OF THE PREFERRED EMBODIMENTS

In this invention, it is assumed that the upper surface shape of the airframe has no effect on the intensity of sonic boom downward from the airframe, and so adopts a design method for airframe models in which the upper surface shape of an airframe designed to reduce wave drag is brought closer to the Area Rule fuselage; the increase in wave drag accompanying reduction of sonic boom is suppressed, and both the economic viability of the supersonic aircraft and environmental compatibility are achieved. The following descriptions provide explanations enabling a specialist in the field to implement and utilize this invention, and explains aspects of the invention thought to be optimal by the inventors.

Figure 1:
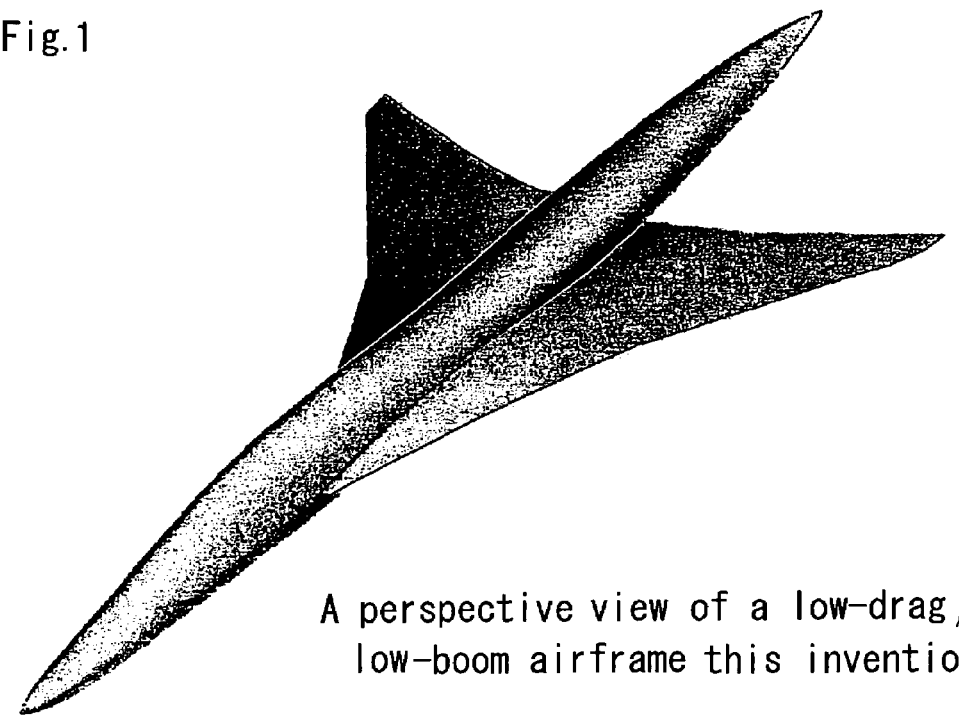
FIG. 1 is a perspective view of a low-drag/low-boom airframe of this invention.
Figures 1, 2:
FIG. 2 is a plane view, side view, and view from the front of a low-drag/low-boom airframe of this invention.
Figure 2:
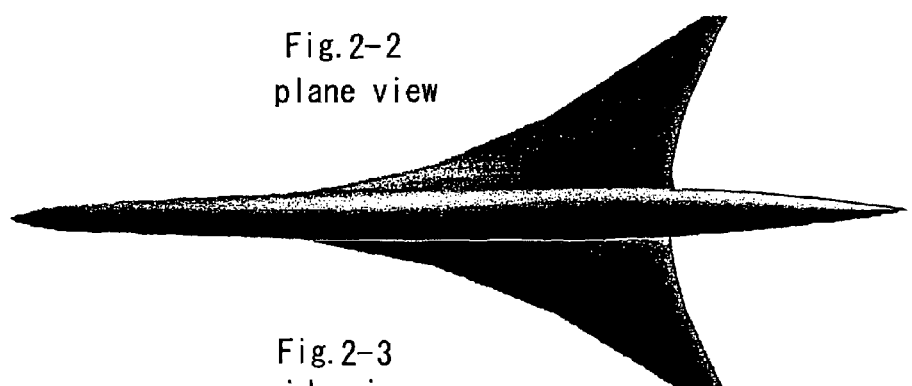
Figures 2, 3:
FIG. 3 is a perspective view showing cross-sections of the front section of a low-drag/low-boom airframe of this invention.
Figure 3:
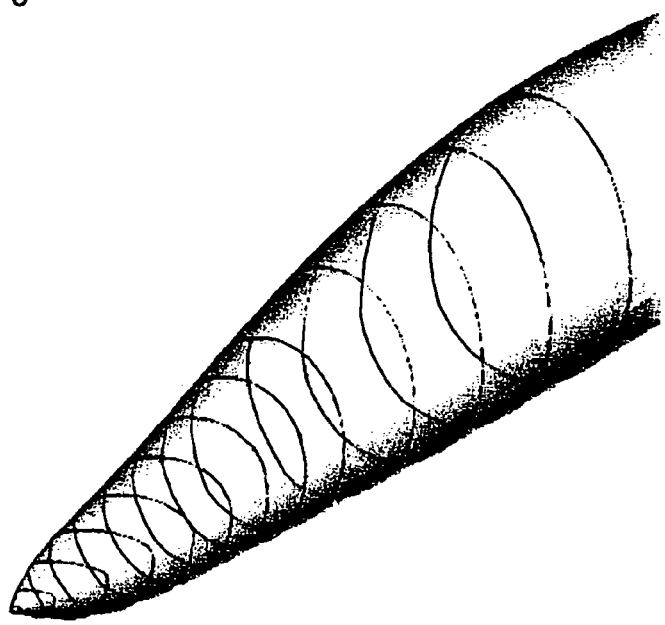
Figure 4:
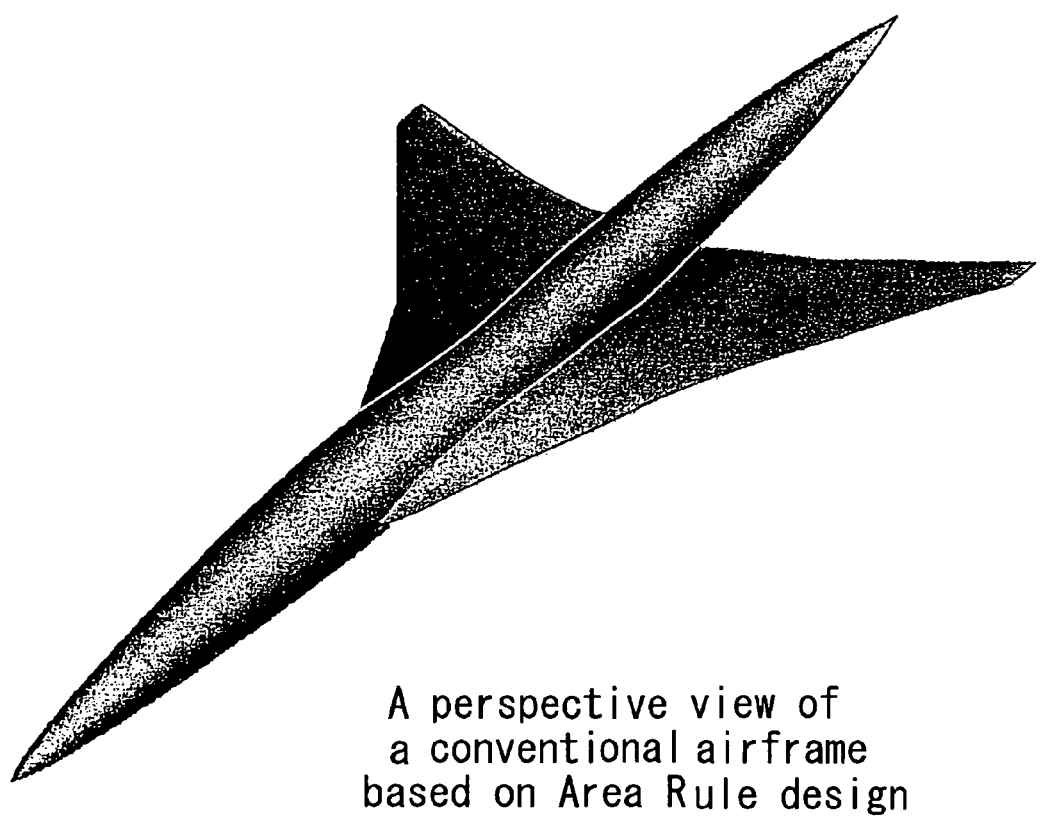
FIG. 4 is a perspective view of a conventional airframe, based on Area Rule design.
Figures 1, 5:
FIG. 5 is a plane view, side view, and view from the front of a conventional airframe, based on the Area Rule.
Figures 2, 5:
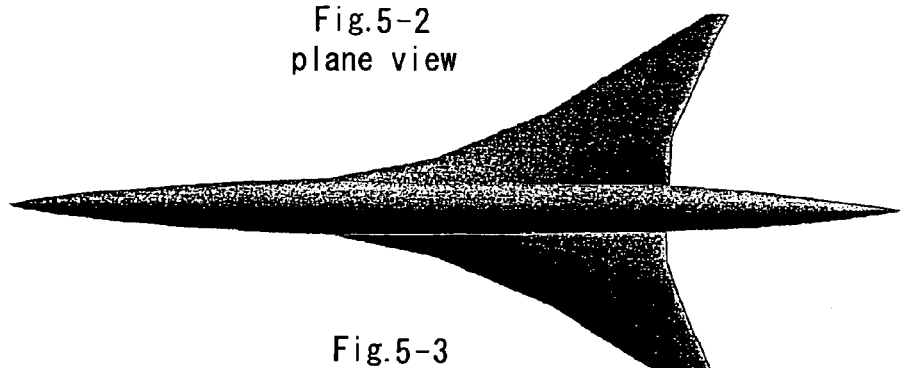
Figures 3, 5:

The airframes shown in FIG. 1, FIG. 2 and FIG. 3 show the fuselages of supersonic aircraft designed based on this invention; FIG. 1 is a perspective view, FIG. 2-2 is a plane view, FIG. 2-3 is side view, and FIG. 2-1 is view from the front; and FIG. 3 shows the cross-sectional shape corresponding to the axial-direction position. This airframe is an example of application of this invention to a supersonic aircraft designed on the assumption of a cruising speed of Mach 1.8. When a certain wing shape is given, the fuselage bottom-surface shape is determined such that a strong pressure increase occurs at the nose, in order to suppress the sonic boom intensity on the ground. Specifically, the panel method is applied to the airframe shape, comprising the wings and initial fuselage shape; the overall drag given the design lift at the flight Mach number and the near-field pressure waveform directly below the airframe under the same conditions are determined, and the airframe near-field pressure waveform is extrapolated to the ground, taking into account the atmosphere vertical-direction distributions (temperature, density, air pressure) using the waveform parameter method, to estimate the pressure waveform on the ground. The fuselage upper-surface shape and lower-surface shape are optimized, taking as an objective function for optimization the drag thus obtained for the entire aircraft and the initial pressure increase amount of the pressure waveform on the ground. By adding small perturbation to design variables for the fuselage upper-surface shape, the shape is modified slightly; applying the panel method to investigate the drag sensitivity with respect to each design variable, and the shape is modified such that the drag is minimized. Similarly, by adding small perturbation to design variables for the fuselage lower-surface shape, the shape is modified slightly; applying the panel method and waveform parameter method to investigate the sensitivity of the initial pressure increase in the ground pressure signature with respect to each design variable, and the shape is modified such that the initial pressure increase is minimized. By repeating these processes, the optimum fuselage upper-surface shape and lower-surface shape can be determined simultaneously for both objective functions. As a result, the fuselage lower-surface shape is such that the nose is sharply convex and the front section to the rear of the nose is gradually convex, combining a concave curvature at the upper-surface shape of the nose, and a convex shape at the front section to the rear of the nose. The airframe near-field pressure waveform is determined using the panel method for the wing-fuselage configuration to which this invention is applied, and the estimated pressure waveform on the ground determined by the waveform parameter method taking this [near-field pressure waveform] as input was confirmed to have an initial pressure increase reduced by approximately 30% compared with the wing-fuselage configuration of the axisymmetric fuselage designed using the Area Rule, indicated by FIG. 4 (perspective view) and FIG. 5-2 is a plane view, FIG. 5-3 is a side view, and FIG. 5-1 is a view from front. At the same time, the estimated drag of the wing-fuselage configuration which is an example of application of this invention using the simultaneously applied panel method was confirmed to result in a drag, at the design lift, reduced by 4% compared with the wing-fuselage configuration for an axisymmetric fuselage resulting from Area Rule design. In this embodiment, the wing shape is the crank arrow-type plane shape; and although the engine nacelle and tail are not included, the advantageous result of the invention permits modification of the wing shape and addition of engine nacelles and the tail.

Embodiment 1

Figure 6:
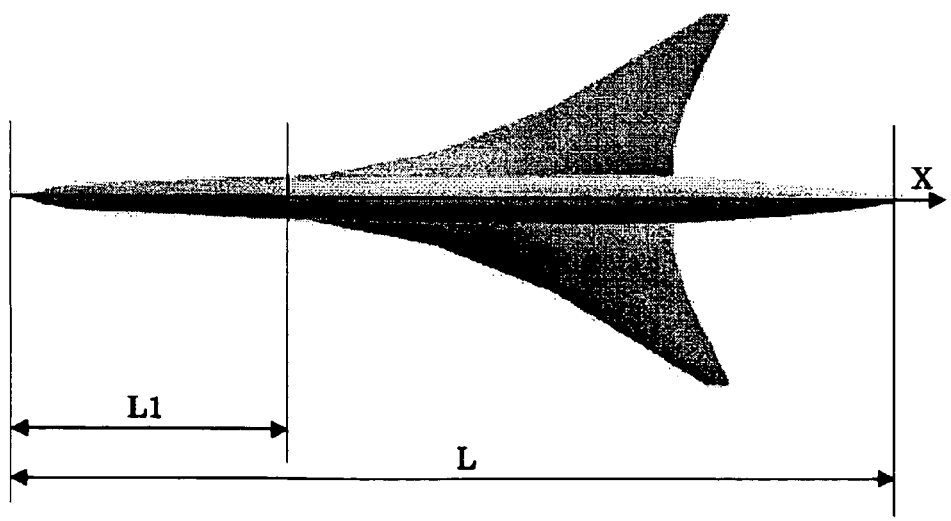
FIG. 6 shows the axisymmetric-direction airframe length and the front section length of an airframe of this invention.
Figure 7:
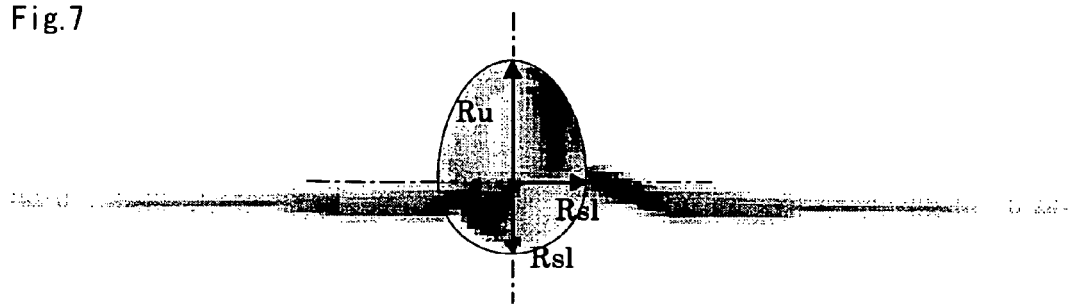
FIG. 7 shows the fuselage upper-surface portion and lower-surface portion cross-sectional shape of an airframe of this invention.
Figure 15:
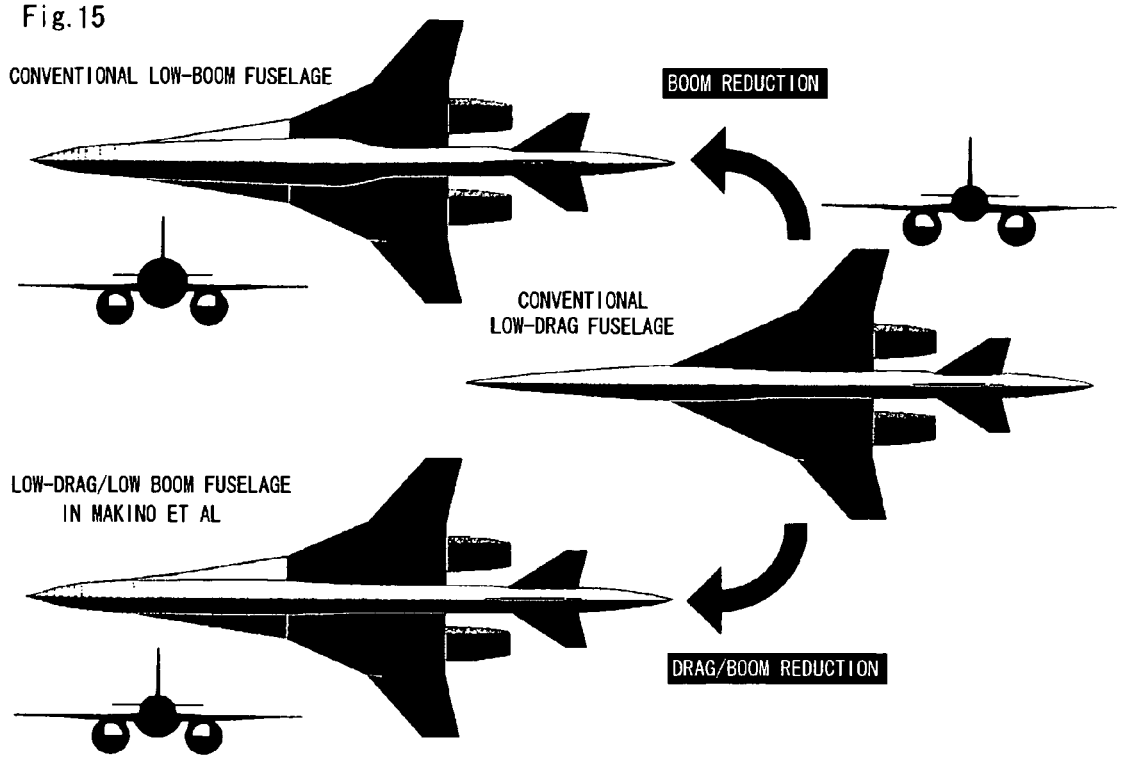
FIG. 15 compares and explains a conventional low-drag airframe, a conventional low-sonic-boom airframe, and a low-drag/low-boom airframe previously presented by the inventors.
Figure 16:
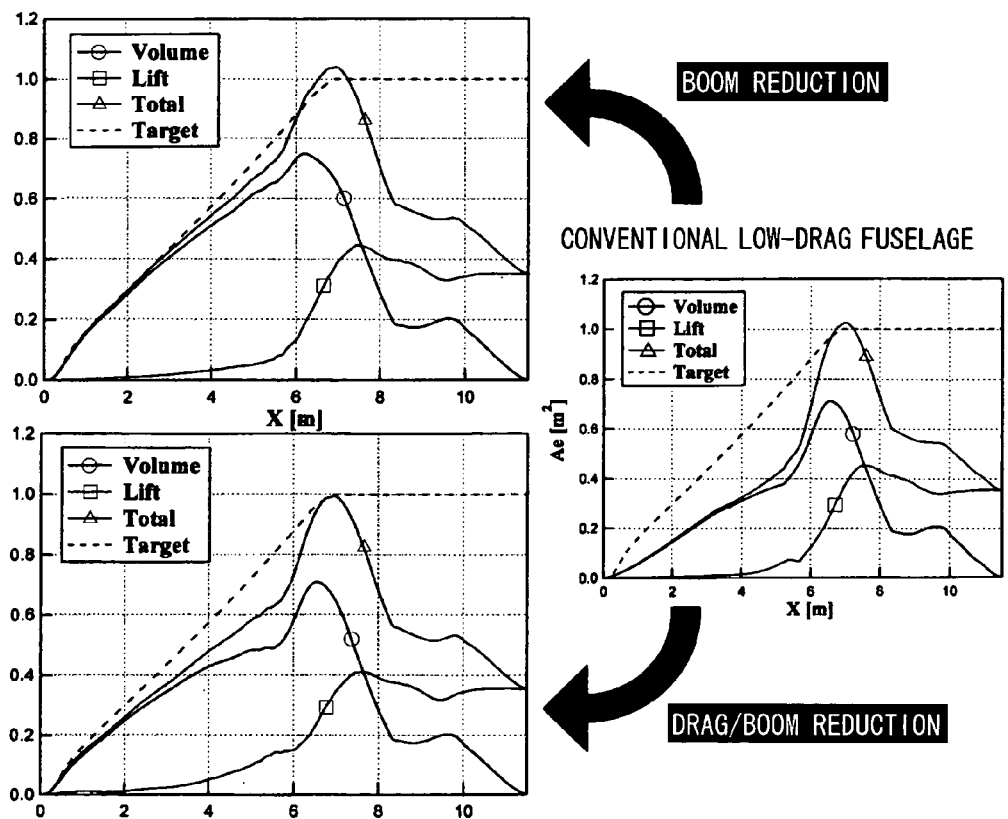
FIG. 16 shows graphs of the equivalent cross-sectional area distributions of the airframes of FIG. 15.
Figure 17:
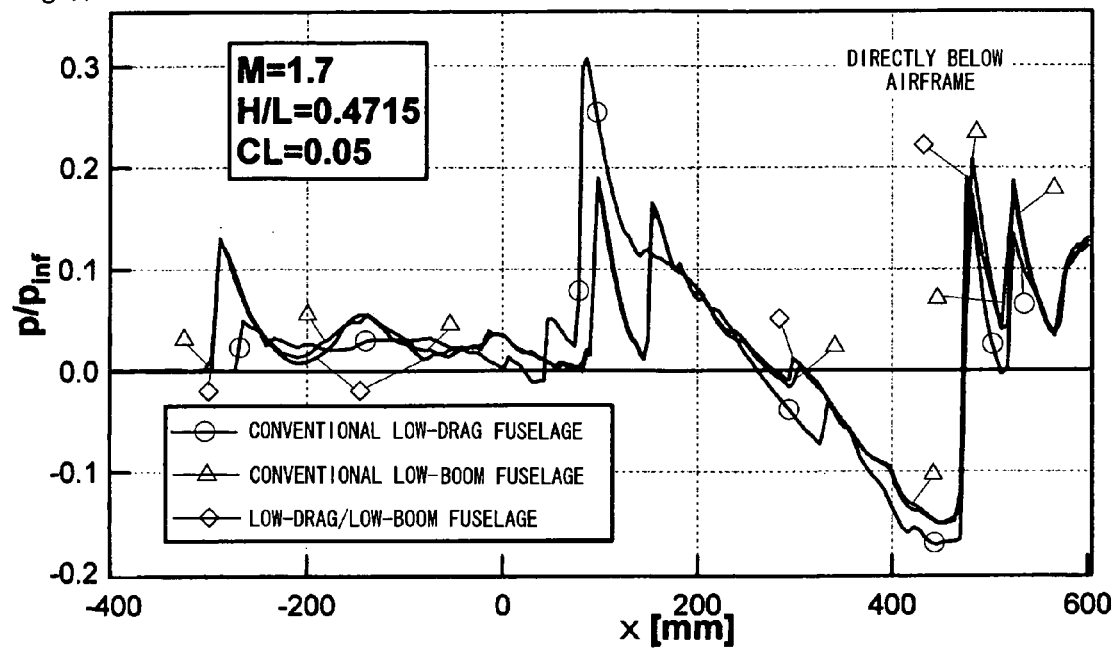
FIG. 17 shows a graph of pressure wave wind tunnel measurement and comparison data for the airframes of FIG. 15; and, FIG. 18 shows a graph which compares the drag $C_D$/lift $C_L$ dimensionless coefficients characteristic data obtained in wind tunnel experiments for the airframes of FIG. 15.

An embodiment of the invention is described. Different methods are used to determine the fuselage lower-surface shape and the fuselage upper-surface shape, whose upper and lower boundary is defined for each fuselage cross-section by the horizontal line including two points at which the fuselage width from the bilateral symmetry plane is maximum. The upper cross-sectional shape of the fuselage front section, from the fuselage tip to the wing-fuselage juncture, is taken to be a semi-ellipse; the lower-surface shape is taken to be a semicircle of radius equal to the radius in the side directions of the above cross-sectional shape. As shown in FIG. 6, the fuselage shape from the fuselage tip to the wing-fuselage juncture (X=0 to L1), taking the axial direction length of the fuselage to be L, is determined as follows. In the following, the axial direction coordinate X is expressed by a dimensionless coordinate (x=X/L1), and as shown in FIG. 7, at the position at which X=L1, that is, x=1, the major axis of the upper-surface semi-ellipse is Ru, the minor axis is Rsl, and the lower-surface semicircle radius is Rsl. The axial-direction shape distribution is defined by a fifth-degree Bezier curve. In general, an nth-degree Bezier curve is defined by a series of n+1 control points $P_0, \ldots, P_n$ as $$R(t) = \sum_{i=0}^{n} B_i^n(t) P_i \quad (1)$$

$$B_i^n(t) = \frac{n!}{(n-i)!i!} t^i (1-t)^{n-i} \quad (2)$$

Equation (2) indicates the reference radius distribution due to the ith basis function at position t; equation (1) is the sum of n+1 of these. In this invention, fifth-degree Bezier curves are used in definitions, and taking the axial-direction position x to be 0 at the tip position and 1 at the wing-fuselage juncture position, the control positions of the six coefficients are represented using dimensionless coordinates by $x_0=0$, $x_1=0.2$, $x_2=0.4$, $x_3=0.6$, $x_4=0.8$, $x_5=1$:

$$x_{Bezier}(t) = \sum_{i=0}^{5} B_i^5(t) x_i \quad (3)$$

The above equation (3) represents the position x corresponding to an arbitrary value of t in the range 0 to 1.

$$r_{Bezier}(t) = \sum_{i=0}^{5} B_i^5(t) r_i \quad (4)$$

The above equation (4) describes the radius distribution over the position x, determined by the above equation (3) for an arbitrary t over the range from 0 to 1. $r_0$ to $r_5$ are Bezier curve coefficients; in this embodiment, the shape is formed taking the upper-surface Bezier coefficients to be 0.0, 0.035× Ru, 0.39×Ru, 0.93×Ru, 10.0×Ru, 1.0×Ru (see A in FIG. 8), and the lower-surface Bezier coefficients to be 0.0, 0.99×Rsl, 0.45×Rsl, 0.89×Rsl, 0.89×Rsl, 10.0×Rsl (see B in FIG. 8). However, in this embodiment the axial-direction length of the airframe is taken to be L, and Ru=0.0435×L, Rsl=0.0263×L.

The above Bezier coefficients are optimum values; but even if the shape is formed with a 5% tolerance provided, the conditions for low drag and low boom are, for practical purposes, satisfied, and can be adopted as design values. If the parameter range is determined such that coefficient tolerance is 5%, then the shape error is as shown in FIG. 9 and FIG. 10. For the upper-surface shape, in the case of coefficients multiplied by 0.95 the Bezier curve control point values are (0.0, 0.033, 0.371, 0.884, 0.950, 0.950), and for coefficients multiplied by 1.05, the Bezier curve control point values are (0.0, 0.037, 0.410, 0.977, 1.050, 1.050). For the side surface and lower surface shapes, when coefficients are multiplied by 0.95, the Bezier curve control point values are (0.0, 0.941, 0.428, 0.846, 0.846, 0.950), and when coefficients are multiplied by 1.05, the Bezier curve control point values are (0.0, 1.040, 0.473, 0.935, 0.935, 1.050).

Figure 18:
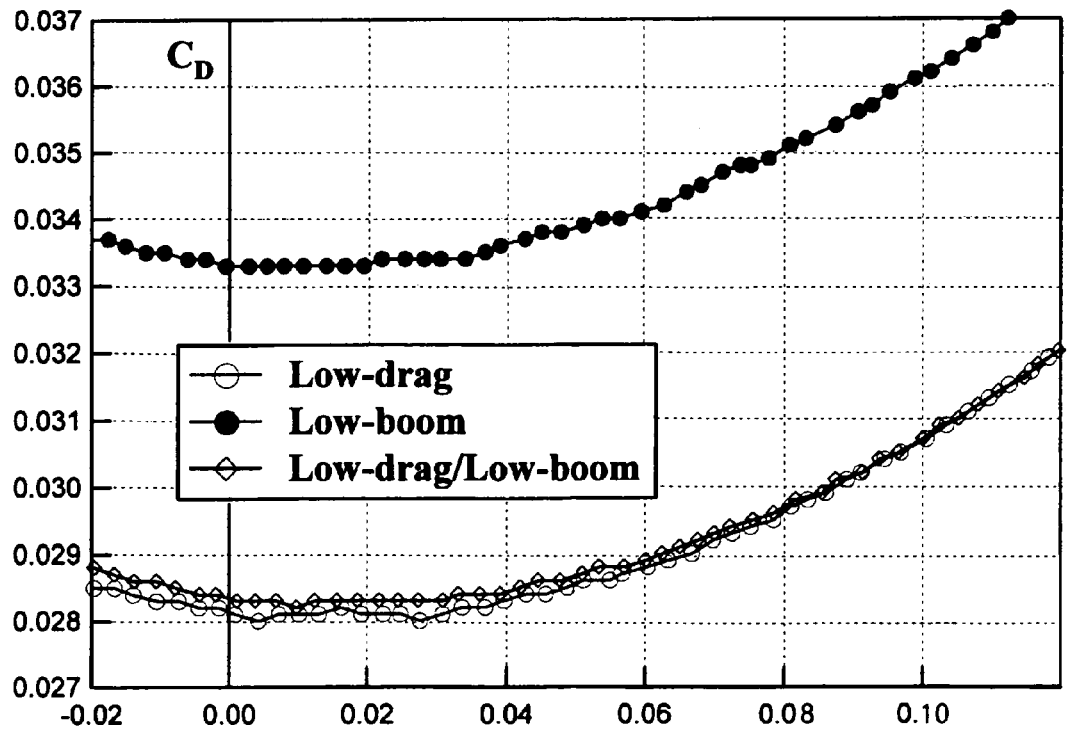

In order to confirm the advantageous results of this embodiment, FIG. 11 shows data for comparison with a conventional low-drag airframe. These results were obtained using the panel method and waveform parameter method in this invention. The graph at the top shows data comparing the dimensionless coefficient of lift $C_L$ versus the drag $C_D$ of a conventional low-drag airframe and a low-drag/low-boom airframe of this invention. The dimensionless coefficient of lift $C_L$ is the lift/(wing area×dynamic pressure), where the dynamic pressure is density×(speed)$^2$/2. This graph is similar to the force measurement results of FIG. 18 for the airframe presented in Makino, Y. et al, "Nonaxisymmetrical Fuselage Shape Modification for Drag Reduction of Low-Sonic-Boom Airplane", AIAA Journal, Vol. 41 No. 8, pp. 1413-1420, 2003, but with the difference that the vertical axis and horizontal axis are reversed. Whereas the values for the previous low-drag/low-boom airframe were substantially the same as for a conventional low-drag airframe, it should be noted that the values of a low-drag/low-boom airframe of this invention are such that at the position at which $C_L$ is 0.1, the drag force is lower.

The graph on the bottom of FIG. 11 shows data comparing the pressure fluctuation on the ground with the passage of time for a conventional low-drag airframe and for a low-drag/low-boom airframe of this invention. Viewing these characteristics, the value of boom at the tip is reduced by approximately ⅔ compared with the conventional low-drag airframe, and the subsequent sawtooth-shape peaks are divided into substantially the same heights, so that it is estimated that there is no overlap phenomenon even at far field, and that low sonic boom is realized.

What is claimed is:

1. A method for determination of the fuselage shape of aircraft for supersonic flight, employing different methods for determining the fuselage lower-surface shape and the fuselage upper-surface shape, whose upper and lower boundary is defined for each fuselage cross-section by the horizontal line including two points at which the fuselage width from the bilateral symmetry plane is maximum, wherein said fuselage lower-surface shape is determined by optimization of an objective function to minimize the pressure increase amount of the sonic boom pressure waveform on the ground, estimated using a panel method and waveform parameter method; and, the fuselage upper-surface shape is determined so as to minimize wave drag.

2. The method for determination of the fuselage shape of aircraft for supersonic flight according to claim 1, wherein the fuselage upper-surface shape is determined by optimization of an objective function to minimize the drag estimated using a panel method.

3. An aircraft fuselage front section shape, in which, whose upper and lower boundary is defined for each fuselage cross-section by the horizontal line including two points at which the fuselage width from the bilateral symmetry plane is maximum, said fuselage lower-surface shape is determined by optimization of an objective function to minimize the pressure increase amount of the estimated sonic boom pressure waveform on the ground, and the fuselage upper-surface shape is determined so as to minimize wave drag, wherein the upper-surface shape of the nose portion, which is the front half of the front section of the fuselage formed from a front section, middle section, and rear section, has a concave curvature, and the shape of the front section to the rear of the nose has a convex shape.

4. The aircraft fuselage front section shape according to claim 3, wherein the side and lower surface shape of the fuselage front section have a sharp convex portion in the nose, and the front section to the rear of the nose has a gradual convex shape.

5. An aircraft fuselage front section shape, formed in a shape such that the upper cross-sectional shape of the fuselage front section from the fuselage tip to the wing-fuselage juncture is a semi-ellipse and the lower cross-sectional shape is a semicircle with radius equal to the minor axis of said semi-ellipse, with the axial-direction distribution defined by fifth-degree Bezier curves, with the control positions of the six coefficients defining fifth-degree Bezier curves are represented by x=0, x=0.2, x=0.4, x=0.6, x=0.8, x=1, where the axial direction position x is represented as a dimensionless coordinate equal to 0 at the tip position and to 1 at the wing-fuselage juncture; with a tolerance of ±5% provided for the upper-surface Bezier coefficients to yield 0.0, 0.035×Ru, 0.39×Ru, 0.93×Ru, 1.0×Ru, 1.0×Ru, and with a tolerance of ±5% provided for the lower-surface Bezier coefficients to yield 0.0, 0.99×Rsl, 0.45×Rsl, 0.89×Rsl, 0.89×Rsl, 1.0×Rsl, where Ru is the major axis at x=1, Rsl is the minor axis at x=1, and when the airframe length in the axial direction is L, Ru=0.0435×L and Rsl=0.0263×L.

* * * * *